United States Patent [19]
Harrison

[11] Patent Number: 5,159,381
[45] Date of Patent: Oct. 27, 1992

[54] ELECTRONIC FLASH CONTROL CIRCUIT

[75] Inventor: George C. Harrison, Chelmsford, Mass.

[73] Assignee: Polaroid Corporation, Cambridge, Mass.

[21] Appl. No.: 527,311

[22] Filed: May 23, 1990

[51] Int. Cl.$^5$ .............................................. G03B 15/05
[52] U.S. Cl. .................................. 354/416; 354/145.1
[58] Field of Search ............... 354/413, 416, 417, 419, 354/145.1

[56] References Cited

U.S. PATENT DOCUMENTS

| | | |
|---|---|---|
| 3,415,644 | 12/1968 | Land . |
| 3,753,392 | 8/1973 | Land . |
| 3,942,183 | 3/1976 | Whiteside ............................ 354/29 |
| 4,243,309 | 1/1981 | Johnson et al. ..................... 354/197 |
| 4,697,906 | 10/1987 | Kobayashi et al. ................. 354/416 |
| 4,839,686 | 6/1989 | Hozomizu et al. ................. 354/416 |
| 4,894,678 | 1/1990 | Farrington et al. ................. 354/415 |
| 4,951,081 | 8/1990 | Hosomiza et al. .................. 354/415 |

Primary Examiner—Russell E. Adams
Attorney, Agent, or Firm—John J. Kelleher

[57] ABSTRACT

An improved electrical circuit for controlling the firing time of an electronic flash tube. The electrical circuit includes a storage capacitor that is chargeable by a suitable power source, a flash tube and an insulated gate bipolar transistor (IGBT), which can be activated between conductive and non-conductive states, that is connected in the discharge path of the storage capacitor through the flash tube. A signal responsive to a flash firing command is applied to the flash tube to initiate flash tube firing after the IGBT has been activated from its non-conductive to its conductive state. A flash terminating command is subsequently applied to the IGBT to terminate flash firing. The flash firing command and the flash terminating command are made independent of one another. By making these commands independent of one another, any undesirable effects of one or more electrical characteristics of the IGBT on flash tube firing is thereby eliminated.

9 Claims, 4 Drawing Sheets

ELECTRONIC FLASH CONTROL CIRCUIT

BACKGROUND OF THE INVENTION

1. Field of the Invention

The present invention relates to electronic flash cameras, in general, and to an electrical circuit for controlling the firing duration of an electronic flash tube prior to and/or during an exposure interval, in particular.

2. Description of the Prior Art

Electrical circuits for controlling the firing duration of an electronic flash tube prior to and/or during an exposure interval are well known in the art. In, for example, U.S. Pat. No. 4,697,906 to Kobayashi et al., the firing duration of a flash tube in an electric flash device is controlled by a conventional NPN transistor in series with the flash tube. In one embodiment thereof, when this series transistor is placed in its ON or conductive state, it causes a previously charged main storage capacitor to become connected between an anode and a cathode of the flash tube. Placing the transistor in its ON state also causes a trigger signal to be applied to an electrode of the flash tube to thereby initiate flash tube firing. When the sensed scene light level reaches a predetermined level, a discharge cut-off signal is generated by a discharge cut-off signal generating circuit. The series transistor and a thyristor coupled thereto are turned OFF in response to this discharge cut-off signal which collectively shut-off the scene-illuminating flash tube. In addition to the size and complexity of this transistor/thyristor type flash tube control system, there is a substantial delay between the point in time when the flash tube is commanded to turn off and the point in time when it actually turns off in response to a turn-off command. This delay may cause excessive scene illumination if compensation is not provided. More importantly though, such a delay may prematurely deplete the charge in the main storage capacitor necessitating a delay in the flash tube firing cycle time so that the main storage capacitor in the electronic flash control circuit may be re-charged to the requisite charge level for proper flash tube firing.

An electrical circuit for controlling the firing duration of a flash tube with a minimum delay between the flash firing ON and OFF commands and the actual turning on and off of the flash tube, has been disclosed in U.S. Pat. No. 4,839,686 to Hosomizu et al. A control circuit for a flash tube is described therein which includes a main storage capacitor adapted to be charged from a suitable power source, a flash tube and an insulated gate bipolar transistor or IGBT, which can be activated between conductive and non-conductive states, that is connected in the discharge path of the main storage capacitor through the flash tube. A signal responsive to a manually generated voltage or flash firing command is applied to a gate terminal of the IGBT to activate same and thereby connect the main storage capacitor between an anode and a cathode of the flash tube. The flash tube control circuit further includes a trigger circuit portion that triggers the flash tube to its ON state in response to the IGBT being activated from its non-conductive to its conductive state. The light output of the flash tube is extinguished by a flash terminating command that removes the flash tube firing voltage, previously applied to the gate of the IGBT, in response to a signal representative of the magnitude of sensed scene light. By removing this voltage from the gate of the IGBT it changes from its conductive to its non-conductive state which interrupts light-producing current flow to the flash tube. In other words, light output from the flash tube is controlled by the magnitude and pulse width of a single voltage pulse that is applied to a gate of an IGBT. Advantages resulting from this type of flash tube control circuit are size, cost and simplicity of design. A significant disadvantage is the variation in the duration of the flash tube firing interval that results from variations in certain IGBT electrical characteristics, from one IGBT to another.

In flash tube control circuits where precise control of the flash tube firing interval is essential in order to produce a proper photographic exposure, variations in this interval between two identical flash tube control circuits employing the same type of IGBT would produce over or under exposed photographic images from one camera to another in electronic flash cameras employing the same flash tube control circuit as described above, for example, with respect to the Hosomizu et al. patent.

In, for example, U.S. Pat. No. 4,894,678 to Farrington et al., an exposure control system is described in which subject distance is derived by measuring subject reflectivity immediately prior to an exposure interval. Subject reflectivity is determined, in part, by illuminating a subject within a scene to be photographed with visible and infrared light for a fixed period of time and then integrating the infrared component of this light that is reflected from the scene subject. The final integrated value thereof constitutes a measure of subject reflectivity. In order to obtain the same measure of subject reflectivity from one electronic flash camera to another employing this same subject reflectivity measuring arrangement, it is essential that the same flash duration interval result when the flash tube is fired for subject reflectivity determining purposes.

In the flash tube control circuit described in the above-noted U.S. Patent to Hosomizu et al., an IGBT is employed to turn ON and turn OFF a scene-illuminating flash tube as previously explained. Activation and de-activation of the IGBT is achieved, in effect, by the application of a voltage to and the removal of a voltage from a gate of this device. The time required to activate the IGBT is determined, in large part, by the magnitude of the capacitance between the gate and an emitter thereof. The greater the magnitude of this capacitor the longer will be the time required to activate the IGBT from its non-conductive to its conductive state. As a general rule, the magnitude of this capacitance may vary over a wide range such as from 600 to 1200 picofarads, from one IGBT to another with a corresponding variation in IGBT turn-on time. Variations of this magnitude would introduce significant errors into reflectivity measurements and into subject distance measurements derived therefrom where the accuracy of such measurements are dependent upon having a known flash firing interval. The magnitude of gate to emitter capacitance can be controlled by selecting only those devices having the same such capacitance from one IGBT to another. However, the cost of this selection process both in terms of the testing that would be required and the number of IGBTs that would have to be discarded, would substantially increase the cost of all of the IGBTs meeting a particular capacitance requirement.

SUMMARY OF THE INVENTION

In accordance with a preferred embodiment of the present invention an improved electrical circuit is provided for controlling the firing time of an electronic flash tube. The electrical circuit includes a main storage capacitor adapter to be charged by a suitable power source, a flash tube and an IGBT, which can be activated between conductive and non-conductive states, that is connected in the discharge path of said storage capacitor through said flash tube. A signal responsive to a flash firing command is applied to the flash tube to initiate flash tube firing and thereby discharge a portion of the charge stored in the main storage capacitor across the flash tube, after the IGBT has been activated from its non-conductive to its conductive state. A flash terminating command is subsequently applied to the IGBT to terminate flash tube firing. The flash firing command and the flash terminating command are made independent of one another. By making these commands independent of one another, the undesirable effects of one or more electrical characteristics of an IGBT on flash tube firing is thereby eliminated.

It is a primary object of the present invention therefore, to provide an electrical circuit that includes an IGBT for controlling flash tube firing time, wherein the undesirable effects of one or more electrical characteristics of the IGBT on flash tube firing are either reduced or eliminated.

It is another object of the present invention to provide electronic flash apparatus for illuminating a subject with light having both visible and infrared components, for a fixed period of time, for subject reflectivity or distance determining purposes, and which can consistently illuminate a scene subject for said fixed period of time from one scene illuminating cycle to another.

It is a further object of the present invention to provide an electronic flash camera wherein the electronic flash portion thereof can be fired for a fixed period of time immediately prior to an exposure interval for reflectivity and/or range related purposes and wherein said firing time can be consistently repeated form one exposure cycle to another.

Other objects, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
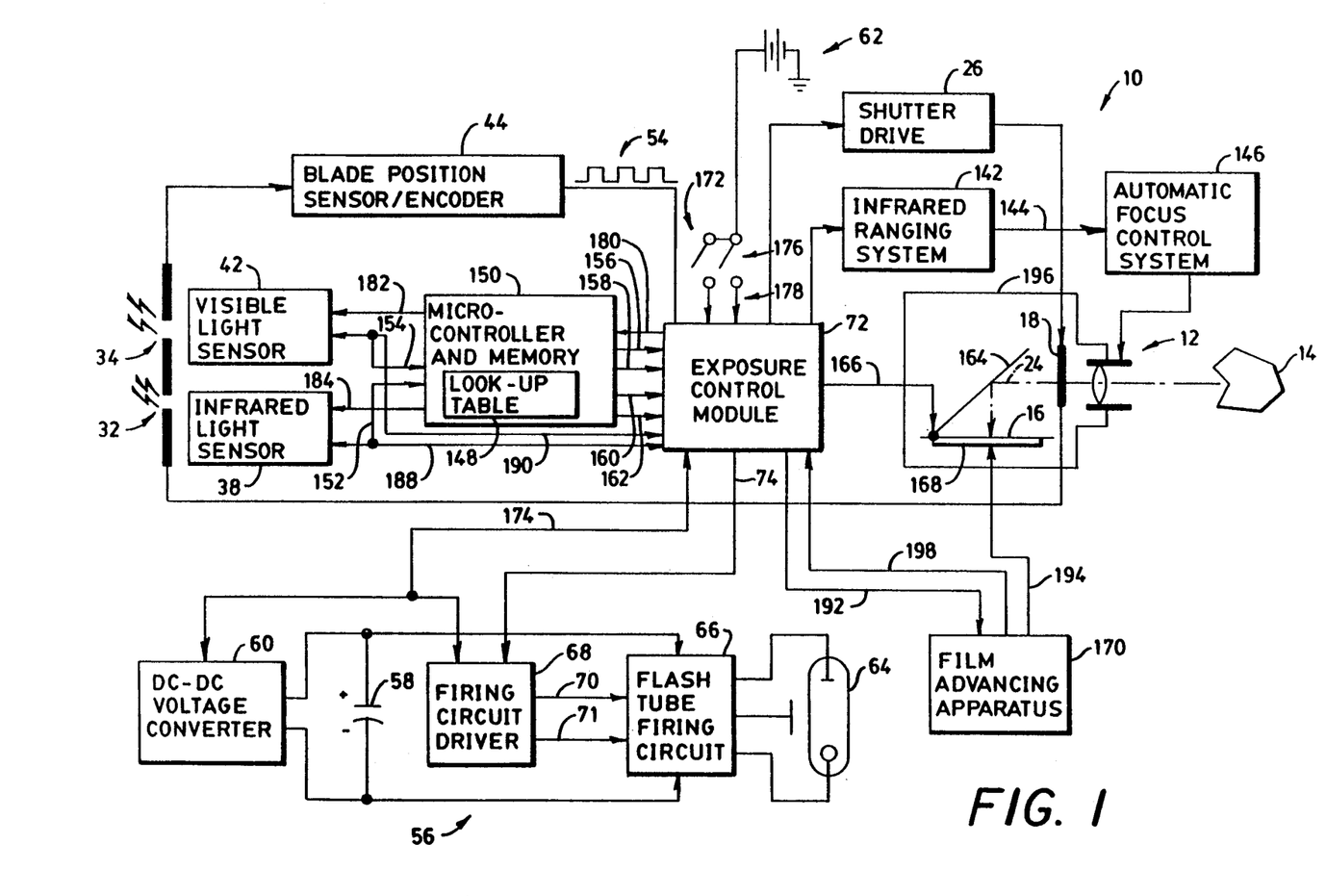
FIG. 1 is a schematic diagram of an electronic flash camera which incorporates a preferred embodiment of the electrical circuit for controlling the energization and de-energization of a flash tube forming a part of the electronic flash camera of the present invention.

Referring now to the drawings, and specifically to FIG. 1, there is shown a single lens reflex (SLR) electronic flash camera 10, of the self-developing type, which incorporates a preferred embodiment of an electrical circuit for controlling the light output of the electronic flash portion thereof immediately prior to an exposure interval for range or subject distance related reasons in a manner that will consistently illuminate a scene subject for the same fixed period of time, from one scene illuminating cycle to another. The camera 10 includes an objective or taking lens 12 of the adjustable focus type that may include one or more elements (only one shown) for focusing image-carrying light rays of, for example, an object 14 on a film plane 16 through an aperture formed in a shutter blade mechanism or assembly 18.

Figure 2A:
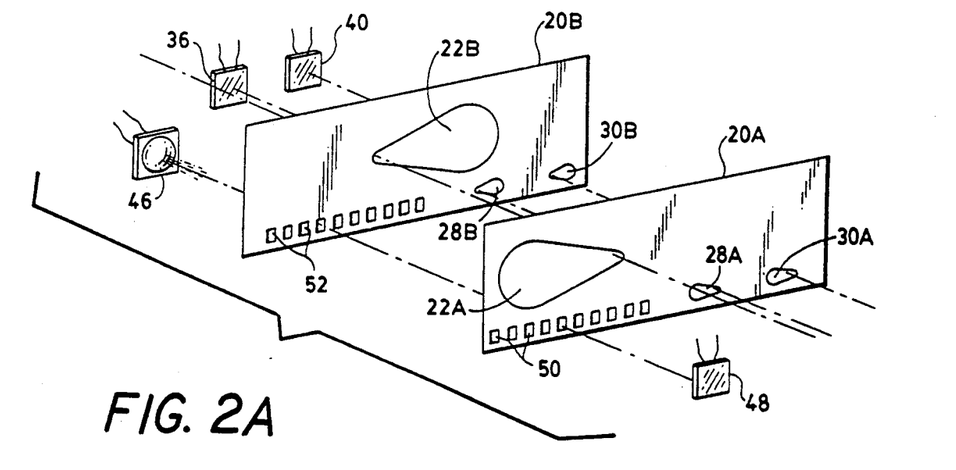
FIG. 2A is an exploded perspective view of a scanning type shutter blade mechanism which is also schematically shown in FIG. 1.
Figure 2B:
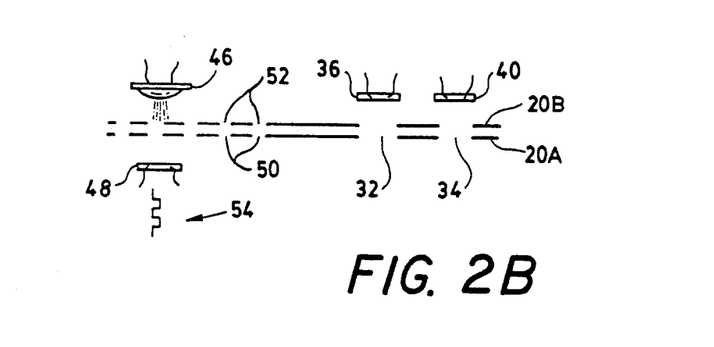
FIG. 2B is an unexploded top view, partly in section, of the shutter blade mechanism of FIG. 2A.

With additional reference to FIGS. 2A and 2B, the blade mechanism 18, positioned intermediate the lens 12 and the film plane 16, includes a pair of overlapping shutter blade elements 20A and 20B of the "scanning" type. Scene light admitting primary apertures 22A and 22B, are respectively provided in the blade elements 20A and 20B to cooperatively define a progressive and predictable variation of effective aperture openings in accordance with simultaneous displacement of one blade element with respect to the other blade element in a manner more fully described in commonly assigned U.S. Pat. No. 3,942,183 to Whiteside, now specifically incorporated herein by reference. The blade element apertures are selectively shaped and positioned so as to overlie the central optical axis 24 of the lens 12 thereby defining a gradually varying effective aperture size as a function of the position of the blades of the blade mechanism 18. A shutter drive 26 is provided for displacing the blade elements 20A and 20B of the blade mechanism 18. The shutter drive 26 includes a tractive electromagnetic device in the form of a solenoid (not shown) employed to displace the shutter blade elements with respect to one another in a manner more fully described in the above-cited Whiteside patent.

Each of the blade elements 20A and 20B of the blade mechanism 18 includes two secondary apertures 28A, 30A and 28B, 30B, respectively. The aperture 28A in the blade 20A cooperates with the aperture 28B in the blade 20B to form an opening 32 and the aperture 30A in blade 20A cooperates with aperture 30B in blade 20B to form an opening 34 through the shutter mechanism 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 36 and an integrator (not shown) within an infrared sensor 38 that senses and integrates a corresponding amount of infrared scene energy through the opening 32. The amount of ambient scene light admitted to the film plane 16 through these primary apertures is controlled by a signal generated by a combination of a visible light photosensitive element 40 and an integrator (not shown) within a visible light sensor 42 that senses and integrates a corresponding amount of visible ambient scene light, through the opening 34. An example of scanning blade elements having primary and secondary apertures that cooperate to control the amount of scene light admitted to a film plane is shown in U.S. Pat. No. 3,942,183, supra.

The camera 10 is provided with a blade position sensor/encoder 44. The sensor/encoder 44 senses the position of the blade elements 20A and 20B with respect to one another and generates a signal representative of the relative blade element position. The sensor/encoder 44 comprises a light emitting diode 46, a photosensor 48 spaced therefrom, and a plurality of slots or openings 50 and 52 formed in the blade element 20A and 20B, respectively. The slots 50, 52 are rectangular in shape, are of uniform size and are equally spaced in a linear direction in their respective blade elements 20A and 20B. The slots 50, 52 are interposed between the light emitting diode 46 and the photosensor 48 such that they alternately block and unblock the transmission of light between these two components to thereby cause the photosensor 48 to generate one or more pulses 54 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulse or pulses 54 is also a measure of the size of the effective or taking aperture formed by the primary apertures 22A and 22B. The size of the slots 50, 52 in respective blade members 20A and 20B is kept to a minimum, in the direction of blade member movement, in order to minimize any blade position errors between the actual size of an effective aperture formed by the primary apertures 22A and 22B and the relative blade position pulses 54 representative of the size of this particular aperture.

The camera 10 is also provided with an electronic flash apparatus 56 together with apparatus for controlling its energization in order to determine subject reflectivity for subject distance or range related reasons and to provide a portion of the exposure value required to illuminate a scene to be photographed. The electronic flash apparatus 56 comprises a main storage capacitor 58 which may be charged up to an operating voltage by any conventional voltage converter circuit (not shown) which would be included within a DC-DC voltage converter 60. the DC-DC voltage converter 60 operates in a conventional manner to convert a DC voltage as may be derived from a battery 62 of the camera 10, which can be in the order of 6 volts, to a suitable operating voltage such as 280 volts. A flash tube 64 of the electronic flash apparatus 56 is electrically coupled to the main storage capacitor 58 by a flash tube firing circuit 66. The details of the firing circuit 66 will be described below with respect to FIG. 3. The flash tube firing circuit 66 is, in turn, coupled to a conventional firing circuit driver 68 that generates fixed and variable width pulses respectively, at the outputs 70 and 71 thereof that control when and for how long the flash tube 64 illuminates a subject to be photographed with visible and infrared light. The firing circuit driver 68 is actuated by a camera operator initiated flash sequence initiating signal from an exposure control module 72 on a path 74. The flash tube firing circuit 66 will now be described in detail.

Figure 3:
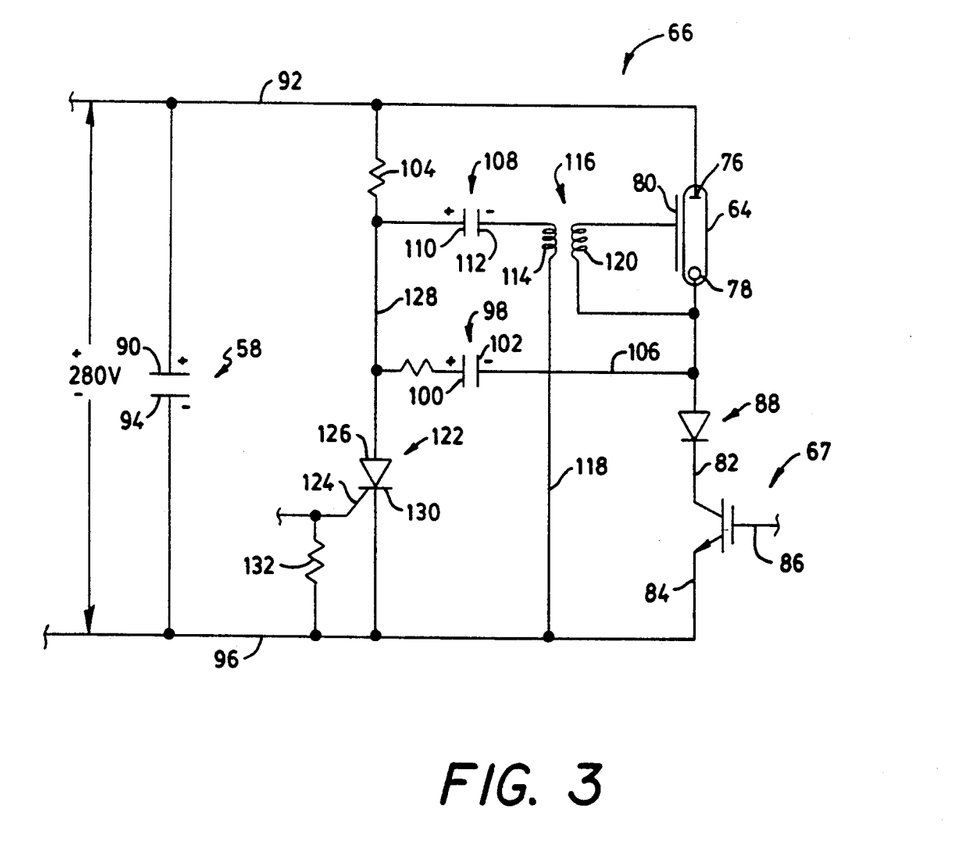
FIG. 3 is a detailed schematic diagram of an electrical circuit for controlling the light output of the flash tube in the electronic flash camera of FIG. 1 in accordance with the present invention.

As shown in FIG. 3, the flash tube firing circuit 66 includes the electronic flash tube 64 having an anode 76, a cathode 78 and a trigger electrode 80. The flash tube 64 is preferably a conventional flash tube having relatively high resistance. The firing circuit 66 also includes an insulated gate bipolar transistor or IGBT 67, such as that which is available from the Mitsubishi Electric Corporation of Tokyo, Japan, having a collector terminal 82, an emitter terminal 84 and a gate terminal 86. The cathode 78 of the flash tube 64 is connected to the collector terminal 82 of the IGBT 67 through a blocking diode 88. The anode 76 of the flash tube 64 is connected to a positively charged electrode 90 of the main storage capacitor 58 through a path 92 and the emitter terminal 84 of the IGBT 67 is connected to a negatively charged electrode 94 of the main storage capacitor 58 through a path 96.

A voltage doubler capacitor 98 is connected between the positively and negatively charged electrodes 90 and 94, respectively, of the main storage capacitor 58. The doubler capacitor 98 includes an electrode 100 and an electrode 102. The electrode 100 is connected to the positively charged electrode 90 of the main storage capacitor 58 through a resistor 104 and the path 92, and the electrode 102 is connected to the negatively charged electrode 94 of the main storage capacitor 58 through the path 106, the blocking diode 88, the IGBT 67 when in its conductive state and the path 96.

A trigger capacitor 108 is also connected between the positively and negatively charged electrodes 90 and 94, respectively, of the main storage capacitor 58. The trigger capacitor 108 includes a positively charged electrode 110 and a negatively charged electrode 112. The electrode 110 is connected to the positively charged electrode 90 of the main storage capacitor 58 through the resistor 104 and the path 92 and the electrode 112 is connected to the negatively charged electrode 94 of the main storage capacitor 58 through a primary winding 114 of a step-up transformer 116, a path 118 and the path 96. The trigger electrode 80 of the electronic flash tube 64 is connected to the cathode 78 of the flash tube 64 through a secondary winding 120 of the step-up transformer 116.

A silicon controlled rectifier or SCR 122 having a gate electrode 124 is also connected between the positively and negatively charged electrodes 90 and 94, respectively, of the main storage capacitor 58. A cathode 126 of the SCR 122 is connected to the electrode 90 through the resistor 104, the path 92 and a path 128. An anode 130 of the SCR 122 is connected to the electrode 94 through the path 96. In addition, the gate electrode 124 of the SCR 122 is connected to the electrode 94 of the main storage capacitor 58 through a bias resistor 132 and the path 96.

The flash tube 64 is activated to illuminate a scene to be photographed with visible light in the following manner. Prior to the activation of the flash tube 64, the DC-DC voltage converter 60 charges the main storage capacitor 58 to a voltage level of approximately 280 VDC. The main storage capacitor electrode 90 is charged positively and the main storage capacitor electrode 94 is charged negatively with respect to the electrode 90 by the voltage converter 60. With the trigger capacitor 108 being connected across the main storage capacitor 58 in the above-described manner, this capacitor is also charged to 280 VDC. The electrodes 110 and 112 of the trigger capacitor 108 are charged positively and negatively, respectively.

Figure 4:
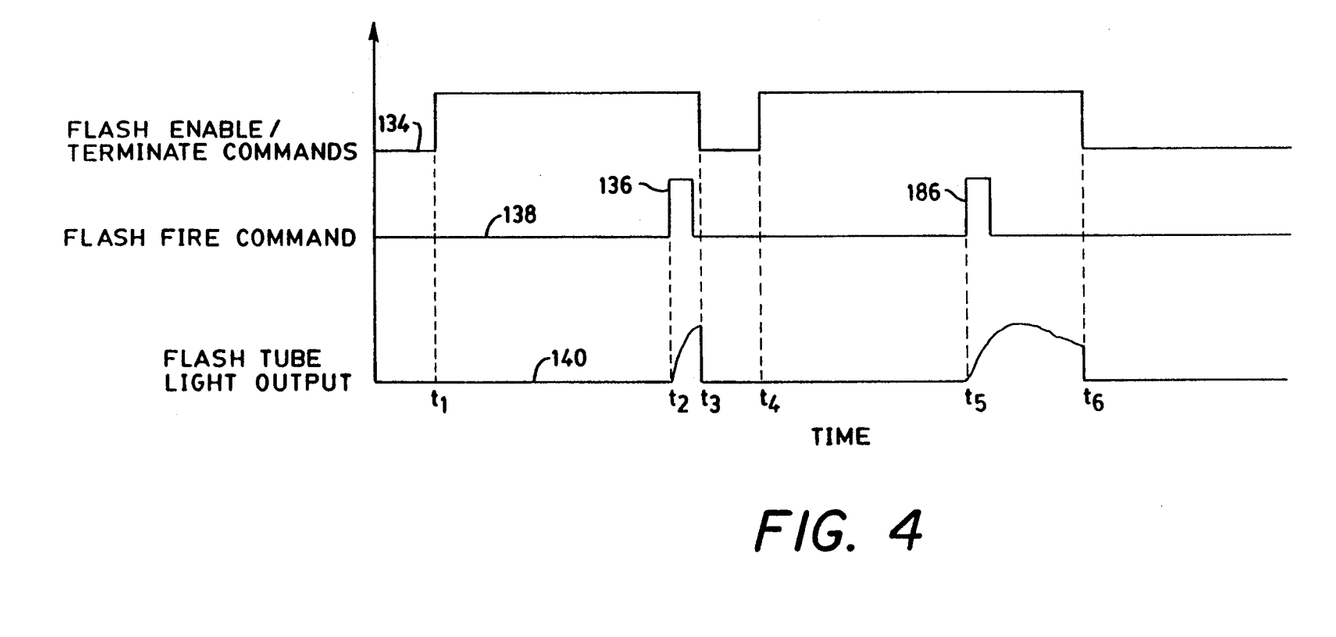
FIG. 4 is a graph of an IGBT enable/terminate signal, a flash tube fire signal and flash tube light output as a function of time, during an exposure cycle.

With additional reference to FIG. 4, when, for example, a camera operator generated, flash sequence initiating signal from the exposure control module 72 is applied to the firing circuit driver 68 through the path 74, a flash enable command is generated at a time $t_1$ as shown by a curve 134 in FIG. 1, at the output 70 thereof and then applied to the gate 86 of the IGBT 67 to thereby activate the IGBT 67 from its non-conductive to its conductive state. When the IGBT 67 is placed in its conductive state, the voltage doubler capacitor 98 is connected across the main storage capacitor 58 and is therefore charged to the same 280 VDC level as that of the main storage capacitor 58. Subsequent to the charging of the voltage doubler capacitor 58. Subsequent to the charging of the voltage doubler capacitor 98 in this manner, and in response to the flash sequence initiating signal on the path 74, a flash firing command in the form of a pulse 136, as shown by a curve 138 in drawing FIG. 4, is generated at the output 71 of the firing circuit driver 68 at a time $t_2$ and is then applied to the gate 124 of the SCR 122. This flash firing command activates the SCR 122 from its non-conductive to its conductive state. As is well known, a voltage level on a capacitor cannot change instantaneously. Therefore, when the SCR 122 conducts, the flash tube 64 has +280 VDC applied to its anode 76 from the electrode 90 of the main storage capacitor 58 and −280 VDC from the electrode 102 of the capacitor 98 for a total of 560 VDC between the flash tube anode 76 and the cathode 78. The doubler capacitor 98, in effect, instantaneously doubles the voltage across the flash tube 64 over what it would have been when the SCR 122 conducted, absent such a doubler capacitor. In addition, the diode 88 becomes reversed biased when the −280 VDC is applied to the cathode 78 which blocks or prevents this voltage from interfering with the proper conductions of the IGBT 67.

At the same time that the SCR 112 is activated to its conductive state in order to cause the capacitor 98 to double the voltage across the flash tube 64 in response to the flash firing command pulse 136 at the time $t_2$, its activation also causes the trigger capacitor 108 to apply the +280 VDC stored therein to the primary winding 114 of the step-up transformer 116 through the path 128 and the path 118. This +280 VDC is increased or stepped-up to approximately 4 K VDC and is then applied to the trigger electrode 80 of the flash tube 64 where it initiates or triggers the firing thereof at the time $t_2$ as shown by the curve 140 in drawing FIG. 4.

Subsequent to the completion of the flash firing command pulse 136, which can either be a fixed or a variable time thereafter, a flash terminating command is generated at a time $t_3$ at the output 70 of the firing circuit driver 68 as shown by the curve 134 in FIG. 4. The flash terminating command, in turn, is applied to the gate 86 of the IGBT 67. The flash terminating command is, in effect, a reduction in the magnitude of the flash enable command previously applied to the same gate 86 of the IGBT 67. When the flash terminating command is applied to the gate 86, it activates the IGBT 67 from its conductive to its non-conductive state to thereby interrupt the flow of electric charge through the flash tube 64 and the light output therefrom. This flash firing sequence is repeated for subsequent or other firings of the flash tube 64. The external load on the SCR 122 automatically causes the activation of the SCR 122 from its conductive to its non-conductive state after the flash tube 64 firing has been terminated by the IGBT 67 and after the flash firing command has been removed from the gate 124 of the SCR 122.

As noted above, the camera 10 includes an objective or taking lens 12, of the adjustable focus type. The lens 12 is preferably in the form of a lens disc, such as that described in U.S. Pat. No. 4,243,309 to Johnson et al., for focusing image-carrying light rays of the object 14 onto the film plane 16.

The photographic camera 10 is also provided with a conventional infrared ranging system 142 that is responsive to the above-mentioned reflectivity signal that is derived in the manner described in the above-noted Farrington et al. patent. When this subject reflectivity signal is applied to the input of the infrared ranging system 142, a signal representative of subject distance that is responsive to the magnitude of this subject reflectivity signal is generated on an output path 144 thereof.

An automatic focus control system 146 is coupled to the output of the infrared ranging system through the path 144. As mentioned above, the objective or taking lens 12 is preferably in the form of a lens disc. This lens disc comprises a plurality of lens elements with each lens element having a different focal length. Each of the lens elements is mounted on a rotatable lens carrier. The automatic focus control system 146, in correspondence with the subject distance signal on the path 144, rotates the lens carrier into a position such that one of the lens elements on the lens carrier causes an image of a subject within the scene to be photographed by the camera 10 to be in focus at the film plane 16, prior to an exposure interval. An automatic focus control system functioning in this manner is described in U.S. Pat. No. 4,243,309, supra.

The camera 10 additionally includes an empirically derived look-up table 148 within a microcontroller and memory 150. The primary purpose of the look-up table 148 is to control the amount of image-carrying scene light rays focused on the film plane 16 by the lens 12 through the effective or taking aperture in the blade mechanism 18 formed by the primary apertures 22A and 22B, as a function of ambient or visible scene light and of subject reflectivity.

As previously explained, the amount of artificial and ambient scene light transmitted to the film plane 16 is indirectly measured by sensing a portion of the artificial and ambient scene light through the openings 32 and 34 in the blade mechanism 18 with photosensors 36 and 40 and their associated integrators located within the infrared sensor 38 and the visible light sensor 42, respectively. A signal generated by the infrared sensor 38 and its associated integrator, which is subject distance related and a measure of subject reflectivity, is routed to the look-up table 148 through a path 152 and a signal generated by the visible light sensor 42 and its associated integrator representative of ambient scene light is routed to the look-up table 148 through a path 154. The look-up table 148 generates a plurality of different signals in response to these two signals for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 148 are 1) an aperture size signal that controls the size of the taking aperture formed by the primary apertures 22A and 22B at which the flash tube 64 is fired during an exposure interval, on an output path 156; 2) a percentage of artificial light signal that controls the amount of artificial light to be added to the scene to be photographed by the flash tube 64, on an output path 158; 3) a percentage of ambient light signal that controls the amount of image-carrying light to be admitted to the film plane 16 through the primary apertures 22A and 22B in the blade mechanism 18, on an output path 160; and 4) a signal to terminate the exposure interval at a time dependent upon the magnitude of the artificial and ambient light signals appearing on the input paths 152 and 154, respectively, to the look-up table 148, if the exposure interval is not sooner terminated, on an output path 162.

Prior to the generation of the above-noted look-up table output signals on the paths 156, 158, 160 and 162, the ambient light signal generated by the visible light sensor 42 is routed to the microcontroller and memory 150 through the path 154 for temporary storage therein. Subsequent to the storage of the ambient light signal in the microcontroller and memory 150 and prior to the start of an exposure interval, a signal representative of the infrared light sensed by the infrared light sensor 38 that is reflected from a scene subject previously illuminated by a wink or short duration flash of light from the flash tube 64 containing both visible and infrared light, is routed to the microcontroller and memory 150 through the path 152. The stored ambient light signal and this subsequently generated infrared light signal are collectively employed by the look-up table 148 to generate the above-noted signals appearing on the output paths 156, 158, 160 and 162 of the microcontroller and memory 150.

The signals appearing at the output paths 156, 158, 160 and 162 of the microcontroller and memory 150 in response to the infrared and ambient scene light signals respectively generated by the sensors 38 and 42 are empirically determined. The look-up table 148 is constructed in accordance with the subjective analysis of a multiplicity of photographic images of subjects at various distances having a range of reflectivities that are formed under a wide range of artificial and ambient scene lighting conditions, in order to produce these signals.

In general, when forming a photographic image at the film plane 16 of the camera 10, the smaller the taking aperture formed by the primary apertures 22A and 22B, the greater will be the depth of field of the lens 12 and the darker will be the ambient scene exposure level because of the reduction in image-carrying scene light caused by the smaller taking aperture. The look-up table 148 is constructed such that it performs a tradeoff between the sharpness of a subject within the scene and the ambient scene exposure. In performing this tradeoff, the look-up table 148 causes the electronic flash 64 to fire at the smallest possible taking aperture, and therefore the greatest depth of field, that will provide the sharpness of a subject within a scene and overall scene exposure, in response to the artificial and ambient scene light level signals generated by the sensors 38 and 42, by controlling the amount of artificial light generated by the scene-illuminating electronic flash 64 and by controlling the maximum size of the taking aperture formed by the primary apertures 22A and 22B.

As noted above, the camera 10 is of the SLR type and therefore includes a conventional reflex mirror 164 that is actuatable by the exposure control module 72 through a path 166. The mirror 164 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a light-tight film cassette 168 which is shown, in FIG. 1, in the condition assumed just after it has been fully inserted into the camera 10. The cassette 168 may enclose the 6 VDC battery 62.

Mounted within the camera 10 is a film advancing apparatus 170 similar to that described in U.S. Pat. No. 3,753,392 to Land that includes a motor for operating a gear train (neither shown) which is coupled with the film advancing apparatus 170 to provide for the continuous movement of an exposed film unit from an exposure position within the camera 10 toward the exterior thereof. The film advancing apparatus 10 additionally includes a film-engaging arm member (not shown) driven by the above-mentioned motor and gear train. The arm member is adapted to extend into a slot in the cassette 168, as shown in the above-noted Land '392 patent, and engage the uppermost film unit located therein at or near its trailing edge prior to moving it out of the cassette 168 and into the bite of a pair of conventional processing rollers (not shown) mounted adjacent the leading edge of the above-mentioned uppermost film unit. The processing rollers, which are rotated by the motor and gear train mentioned above continue the uninterrupted movement of the exposed film unit toward the exterior of the camera 10 while simultaneously rupturing a container of processing liquid at the leading of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. for the purpose of this description it is assumed that the taking aperture of the blade mechanism 18 is in its full open position, that the openings 32 and 34 formed by the secondary apertures in the blade mechanism 18 are also fully opened, that the mirror 164 is in its viewing or light blocking position, that the flash apparatus 56 has been energized by the prior closure of a switch 172 that coupled the battery 62 to the DC-DC voltage converter 60 through the exposure control module 72 and a path 174 and that the main storage capacitor 58 and the trigger capacitor 108 are fully charged and ready for the initiation of an exposure cycle.

With reference to FIGS. 1, 2A, 2B, 3 and 4 of the drawings, a switch 176 is actuated to its closed position by a camera operator to initiate the exposure cycle. The closure of the switch 176 couples the battery 62 to the exposure control module 72 through a path 178. With the blade mechanism opening 34 formed by the secondary apertures 30A and 30B adjacent the visible light sensor 42 in its full open position, the exposure control module 72 and the microcontroller and memory 150 coupled thereto through a path 180, in turn, enable the visible light sensor 42 through a path 182 to integrate ambient scene light to a predetermined level and then send the integrated value to the look-up table 148 within the microcontroller and memory 150 through the path 154 for temporary storage.

The exposure control module 72 then energizes the shutter drive 26 to actuate the blade mechanism 18 and therefore the taking aperture together with the opening 32 formed by the secondary apertures 28A and 28B and the opening 34 formed by the secondary apertures 30A and 30B to their fully closed positions. Subsequent to closing the opening 32 and prior to the initiation of an exposure interval, the shutter drive 26 causes the opening 32 to increase in size toward its fully opened position. While the opening 32 is being moved toward its fully opened position, the exposure control module 72 actuates means (not shown) for moving the mirror 164 from its viewing or light blocking position, where it precludes the transmission of image-carrying light rays to the film plane 16, to its light unblocking position (as shown in FIG. 1) where it facilitates the transmission of image-carrying light rays to the film plane 16 during an exposure interval. When the opening 32 adjacent the infrared light sensor 38 is in its fully open position, the exposure control module 72 commands the firing circuit driver 68 through the path 74 to generate a flash enable command at the time $t_1$ as shown by the curve 134 in FIG. 4 at the firing circuit driver output path 70 and at the input to the flash tube firing circuit 66. This flash enable command is, in turn, applied to the gate 86 of the IGBT 67 where it activates the IGBT 67 from its non-conductive to its conductive state as previously explained. At the time $t_2$ the firing circuit driver is also commanded to generate a flash firing command pulse 136, as shown by the curve 138 in FIG. 4, at its output path 71 and at the input to the flash tube firing circuit 66. This flash firing command is, in turn, applied to the gate 124 of the SCR 122 to initiate flash tube firing in the previously described manner. A predetermined thirty-five microseconds after the application of this flash firing command, a flash terminating command is applied to the gate 86 of the IGBT 67 by the firing circuit driver at the time $t_3$, in response to an exposure control module command on the path 74, in order to terminate the scene illuminating light output of the flash tube 64.

The flash terminating command applied to the gate 86 of the IGBT 67 at the time $t_3$ as represented by the curve 134 in FIG. 4 is a reduction in the magnitude of the flash enable command previously applied to the gate 86. When applied to the gate 86, the flash terminating command activates the IGBT 67 from its conductive to its non-conductive state to thereby interrupt electrical charge flow to and therefore extinguish the scene illuminating light output from the flash tube 64. When activated in this manner, the flash tube 64 illuminates the scene to be photographed with a thirty-five microsecond pulse of visible and infrared light. This pulse of light constitutes a first pulse of light directed toward the scene to be photographed.

In addition to causing the illumination of the scene for thirty-five microseconds prior to the initiation of an exposure interval, the exposure control module 72 enables the integrator within the infrared sensor 38 through a path 184 during this same period of time and then causes the integrated value, which constitutes a measure of subject reflectivity, to be sent to the look-up table 148 within the microcontroller and memory 150 through the path 152. Upon receipt of this subject reflectivity signal, the look-up table 148 combines it with the ambient light or scene brightness signal previously stored in the microcontroller 150. These combined signals are then employed to generate the aperture size flash fire signal, the percentage of artificial light signal, the percentage of ambient light signal and the end of exposure signal subsequently appearing on the microcontroller 150 output paths 156, 158, 160 and 162, respectively, that are, in turn, applied to the exposure control module 72. Upon receipt of these look-up table generated signals, the exposure control module 72 actuates the shutter drive 26 and the blade mechanism 18 coupled thereto such that the opening 32 formed by the secondary apertures 28A and 28B is placed in its fully closed position and then actuates the shutter drive 26 and the blade mechanism 18 to initiate an exposure interval. The exposure control module 72 includes four conventional comparators (not shown) to determine when the four conditions represented by the microcontroller 150 output signals on the paths 156, 158, 160 and 162 and employed in the generation of an exposure interval have been achieved. An exposure interval is defined therein as the period of time that the shutter mechanism 18 allows image-carrying light rays collected by the lens 12 to reach the film plane 16.

The first of the above-mentioned comparators compares the reference or desired aperture size flash fire signal on microcontroller output path 156 with the actual blade position signal and therefore the taking aperture size as represented by the pulses 54 from the blade position sensor/encoder 44. When this first comparator determines that these two signals are equal, the exposure control module 72 commands the firing circuit driver 68 through the path 74 to generate a flash enable command at the time $t_4$ as shown by the curve 134 in FIG. 4 at the firing circuit driver output path 70 and at the gate 86 of the IGBT 67. The flash enable command once again activates the IGBT 67 from its non-conductive to its conductive state in the previously described manner. At a time $t_5$ the firing circuit driver 68 is additionally commanded to generate a flash firing command pulse 186 at its output path 71, as shown by the curve 138 in FIG. 4, and then apply this pulse 186 to the gate 124 of the SCR 122 to thereby initiate flash tube 64 firing. Firing of the flash tube 64 illuminates the scene being photographed with light containing both visible and infrared light, during the exposure interval. The light output of the flash tube 64 at this time is represented by the curve 140 in FIG. 4 commencing at the time $t_5$.

The second of the above-mentioned comparators compares the reference or desired percentage of artificial light signal on microcontroller output path 158 with the actual level of artificial light illuminating the scene as sensed by the infrared light sensor 38 during the exposure interval which is routed to the exposure control module 72 through a path 188. When this second comparator determines that these two signals are equal, the exposure control module 72 commands the firing circuit driver to generate a flash terminating command at a time $t_6$ at its output path 70 and at the gate 124 of the SCR 122 in the previously described manner, as shown by the curve 140 in FIG. 4, to thereby extinguish the light output of the flash tube 64, also in the previously described manner. This illumination of the scene with artificial light from the time $t_5$ through the time $t_6$ constitutes a second pulse of light that is directed toward the scene to be photographed.

The third of the above-mentioned comparators compares the reference or desired percentage of visible light signal on microcontroller output path 160 with the actual level of visible light illuminating the scene as sensed by the visible light sensor 42 that is routed to the exposure control module 72 through a path 190. When this third comparator determines that these two signals are equal, the exposure control module 72 actuates the shutter drive 26 to close the taking aperture in the blade mechanism 18 and thereby terminate the exposure interval.

Under certain scene lighting and subject reflectivity conditions there may be insufficient ambient and/or artificial scene light reflected from the scene for the infrared light sensor 38 and/or the visible light sensor 42 to generate a signal that is capable of causing the exposure control module 72 to terminate an exposure interval in a reasonable amount of time. A fourth comparator arrangement is provided to overcome this problem. This fourth comparator compares a signal on the microcontroller output path 162 representative of the level of ambient and/or scene light reflected from the scene with a predetermined reference signal stored within the exposure control module 72. If the signal on the path 162 is greater than the reference signal, the exposure interval will be limited to a relatively short period of time such as 400 milliseconds and if it is less than the reference signal, the exposure interval will be limited to a relatively long period of time such as 40 milliseconds unless terminated sooner by the presence of greater levels of ambient and/or artificial scene light.

At the completion of the exposure interval, the exposure control module 72 actuates the mirror 164 towards its light-blocking position, and actuates the film advancing apparatus 170 and the drive motor (not shown) included therein, through a path 192, to initiate the transport and processing of an exposed, self-developing film unit. The film advancing apparatus 170, in turn, moves the exposed film unit located in the cassette 168, through a path 194, into the bite of the pair of adjacent processing rollers (not shown), in the manner described above, to spread processing liquid between certain film layers and to move the exposed film unit into an exit slot (not shown) in a housing 196 of the self-developing camera 10. After the mirror 164 has been actuated to its light blocking position where it precludes the passage of light to the film plane 16, the exposure control module 72 actuates the shutter drive 26 and the shutter mechanism 18 coupled thereto such that the primary or taking aperture thereof is placed in its fully opened position. After the film advancing apparatus 170 has moved the exposed film unit into the above mentioned pair of rollers, a film movement completion signal is routed to exposure control module 72 through a path 198 and then to the microcontroller 150 coupled thereto through the path 180. Upon receipt of this film movement completion signal, the exposure control module 72 initiates the charging of the electronic flash apparatus 56 with a signal that is transmitted to the converter 60 through the path 174. When the main storage capacitor 58 of the electronic flash apparatus 56 is fully charged, as sensed through the path 174, the exposure control module 72 places the exposure control system of the camera 10 in condition for the initiation of the next exposure cycle.

In the exposure control system described above, a source of artificial light generated by the flash tube 64 was employed to illuminate the scene with both visible and infrared light. The flash tube 64 illuminates the scene twice during an exposure cycle, once before and once during an exposure interval. Both the visible and infrared light were employed for exposure control during an exposure interval. However, only the infrared light from the flash tube 64 was employed for exposure control immediately prior to or at the early stages of the exposure interval. By firing the flash tube 64 twice and utilizing the infrared portion of the illumination generated thereby in the determination of subject reflectivity before an exposure interval, only a single source of illumination is required. It should be noted, however, that exposure interval and pre-exposure interval illumination could be provided with two separate light sources. One source would be that provided by the flash tube 64 to generate both visible and infrared light and would be employed during the exposure interval. The other source would only have to emit infrared light prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed is:

1. An electrical circuit for controlling the firing time of an electronic flash tube comprising:
   a main storage capacitor adapted to be charged by a power source;
   a flash tube, having an anode and a cathode, operable to discharge at least a portion of the electrical charge stored in said main storage capacitor and thereby emit a flash of light;
   means for generating a flash sequence initiating signal;
   means responsive to said flash sequence initiating signal for generating a flash enable command;
   means responsive to said flash sequence initiating signal for generating a flash firing command subsequent to the generation of said flash enable command;
   a trigger means for firing said flash tube;
   means for generating a flash terminating command;
   an insulated gate bipolar transistor disposed in a discharge path of said main storage capacitor through said flash tube, said insulated gate bipolar transistor having a conductive state where it enables the passage of said electrical charge through said flash tube and a non-conductive state where it precludes such passage of said electrical charge; and
   control means 1) responsive to said flash enable command for activating said insulated gate bipolar transistor from its said non-conductive to its said conductive state to thereby couple said main storage capacitor between said anode and cathode of said flash tube, 2) responsive to said flash firing command for activating said trigger means to initiate firing of said flash tube, and 3) responsive to said flash terminating command for activating said insulated gate bipolar transistor from its said conductive state to its said non-conductive state to thereby terminate the firing of said flash tube.

2. The electrical circuit of claim 1 wherein said flash tube includes a trigger electrode, said trigger means generates a flash triggering signal in response to said flash firing command and said trigger signal is applied to said trigger electrode to initiate flash tube firing.

3. The electrical circuit of claim 2 wherein said means for generating a flash enable command includes means for generating said flash enable command a fixed period of time after the generation of said flash sequence initiating signal and before the generation of said flash firing command.

4. The electrical circuit of claim 1 wherein said insulated gate bipolar transistor includes a gate electrode, and said flash enable command and said flash terminating command are applied to said gate electrode to activate said insulated gate bipolar transistor to its said conductive state and to its said non-conductive state, respectively.

5. An exposure control system for photographic apparatus comprising:
- a blade mechanism that defines an exposure aperture, said blade mechanism being mounted for movement between a blocking arrangement in which said blade mechanism is in light blocking relation with respect to an optical path so as to preclude scene light from being transmitted along the optical path to a film plane and an unblocking arrangement in which said blade mechanism is in light unblocking relation with respect to the optical path so as to allow the passage of scene light to the film plane through said exposure aperture when said blade mechanism is actuated between its said light blocking and unblocking arrangements to produce an exposure interval;
- a main storage capacitor adapted to be charged by a power source;
- a flash tube, having an anode and a cathode, operable to discharge at least a portion of the electrical charge stored in said main storage capacitor and thereby emit a flash of light to illuminate a subject to be photographed;
- means for generating a flash enable command;
- means for generating a flash firing command subsequent to the generation of said flash enable command;
- a trigger means for firing said flash tube;
- means for generating a flash terminating command;
- an insulated gate bipolar transistor disposed in a discharge path of said main storage capacitor through said flash tube, said insulated gate bipolar transistor having a conductive state where it enables the passage of said electrical charge through said flash tube and a non-conductive state where it precludes such passage of said electrical charge; and
- control means for actuating said blade mechanism to generate said exposure interval, and 1) responsive to said flash enable command for activating said insulated gate bipolar transistor from its said non-conductive to its said conductive state to thereby couple said main storage capacitor between said anode and cathode of said flash tube, 2) responsive to said flash firing command for activating said trigger means to initiate firing of said flash tube, and 3) responsive to said flash terminating command for activating said insulated gate bipolar transistor from its said conductive state to its said non-conductive state to thereby terminate the firing of said flash tube in order to illuminate the subject immediately prior to the exposure interval so that certain subject characteristics may be evaluated for subsequent exposure control purposes during the exposure interval.

6. The exposure control system of claim 5 wherein said trigger means includes an SCR, said SCR has a conductive state where, when selected, initiates firing of said flash tube and a non-conductive state where, when selected, precludes firing of said flash tube, said SCR is responsive to said flash firing command for activating said SCR from its said non-conductive state to its said conductive state to initiate flash tube firing.

7. The exposure control system of claim 6 wherein said insulated gate bipolar transistor includes a gate electrode and said flash enable command and said flash terminating command are applied to said gate electrode to activate said insulated gate bipolar transistor from its non-conductive to its conductive state, and from its said conductive to its said non-conductive state, respectively.

8. An electric flash camera having means for defining a film plane;
- a lens system for directing image-carrying light rays along an optical path from a scene onto photosensitive material located at the film plane;
- a blade mechanism that defines an exposure aperture, said blade mechanism being mounted for movement between a blocking arrangement in which said blade mechanism is in light blocking relation with respect to the optical path so as to preclude scene light from being transmitted along the optical path to the film plane and an unblocking arrangement in which said blade mechanism is in light unblocking relation with respect to the optical path so as to allow the passage of scene light to the film plane through said exposure aperture when said blade mechanism is actuated between its said light blocking and unblocking arrangements to produce an exposure interval;
- a main storage capacitor adapted to be charged by a power source;
- a flash tube, having an anode and a cathode, operable to discharge at least a portion of the electrical charge stored in said main storage capacitor and thereby emit a flash of light to illuminate a subject to be photographed;
- means for generating a flash enable command;
- means for generating a flash firing command subsequent to the generation of said flash enable command;
- a trigger means for firing said flash tube;
- means for generating a flash terminating command;
- an insulated gate bipolar transistor disposed in a discharge path of said main storage capacitor through said flash tube, said insulated gate bipolar transistor having a conductive state where it enables the passage of said electrical charge through said flash tube and a non-conductive state where it precludes such passage of said electrical charge;
- control means for actuating said blade mechanism to generate said exposure interval, and 1) responsive to said flash enable command for actuating said insulated gate bipolar transistor from its said non-conductive to its said conductive state to thereby couple said main storage capacitor between said anode and cathode of said flash tube, 2) responsive to said flash firing command for activating said trigger means to initiate firing of said flash tube, and 3) responsive to said flash terminating command for activating said insulated gate bipolar transistor from its said conductive state to its said non-conductive state to thereby terminate the firing of said flash tube in order to illuminate the subject immediately prior to the exposure interval so that certain subject characteristics may be evaluated for subsequent exposure control purposes during the exposure interval.

9. The electronic flash camera of claim 8 wherein said control means includes means responsive to light emitted by said flash tube and reflected from the subject for generating a signal representative of subject reflectivity, means responsive to said subject reflectivity signal for generating a signal representative of subject distance, that said lens system is of the adjustable focus type, and drive means coupled to said adjustable focus lens system and responsive to said subject distance signal for adjusting said lens system to focus an image of the subject at said camera's film plane.

* * * * *